US012600260B2

(12) United States Patent
Li et al.

(10) Patent No.: US 12,600,260 B2
(45) Date of Patent: Apr. 14, 2026

(54) SYSTEMS AND METHODS FOR ELECTRIC VEHICLE (EV) MESH CONNECTIVITY AND ENERGY MANAGEMENT

(71) Applicant: SWTCH Energy Inc., Toronto (CA)

(72) Inventors: Carter Li, Toronto (CA); Seyed Javad Fattahi, Vanier (CA)

(73) Assignee: SWTCH ENERGY INC., Toronto (CA)

( * ) Notice: Subject to any disclaimer, the term of this patent is extended or adjusted under 35 U.S.C. 154(b) by 0 days.

(21) Appl. No.: 18/757,790

(22) Filed: Jun. 28, 2024

(65) Prior Publication Data

US 2026/0001439 A1      Jan. 1, 2026

(51) Int. Cl.
*B60L 53/67*       (2019.01)
*B60L 53/14*       (2019.01)
(Continued)

(52) U.S. Cl.
CPC .............. *B60L 53/68* (2019.02); *B60L 53/62* (2019.02); *B60L 53/63* (2019.02); *B60L 53/665* (2019.02);
(Continued)

(58) Field of Classification Search
CPC .......... B60L 53/67; B60L 53/62; B60L 53/63; B60L 53/665; B60L 53/68; B60L 55/00; B60L 2240/72
See application file for complete search history.

(56) References Cited

U.S. PATENT DOCUMENTS 8,368,348 B2    2/2013  Reddy
8,710,372 B2    4/2014  Karner
(Continued)

FOREIGN PATENT DOCUMENTS

WO      2018098400 A1    5/2018
WO      2022241267 A1    11/2022

OTHER PUBLICATIONS

The Oxford Institute for Energy Studies. "Bidirectional charging as a strategy for rural PV integration in China." Dec. 2023, https://www.oxfordenergy.org/wpcms/wp-content/uploads/2023/12/CE12-Bidirectional-charging-as-a-strategy-for-rural-PV-integration-in-China2-ah.pdf. ISBN: 978-1-78467-225-6.

*Primary Examiner* — David V Henze-Gongola
(74) *Attorney, Agent, or Firm* — Smart & Biggar LP

(57) ABSTRACT

Systems and methods for establishing mesh connectivity among electric vehicle (EV) chargers within a network, leveraging Sub-GHz networking for enhanced communication. The method involves configuring a mesh network architecture connecting existing EV charging units, a host application, and a user application. Load balancing mechanisms consider the building's power usage beyond EV charging units, ensuring efficient energy distribution in real-time. Power allocation to EV chargers is dynamically adjusted based on load balancing metrics. The mesh network is seamlessly integrated with an internet backbone, facilitating communication with user devices such as smartphones and vehicles. This enables efficient communication between charging stations and a hosting application, allowing real-time monitoring and management of the charging network's power supply. The user application offers remote monitoring, scheduling of charging sessions, and billing functionalities, enhancing user experience and system efficiency. Some example embodiments include programs to connect the user application, host application, and mesh network.

18 Claims, 4 Drawing Sheets

(51) Int. Cl.

| | |
|---|---|
| *B60L 53/62* | (2019.01) |
| *B60L 53/63* | (2019.01) |
| *B60L 53/66* | (2019.01) |
| *B60L 53/68* | (2019.01) |
| *B60L 55/00* | (2019.01) |

(52) U.S. Cl.
CPC .............. *B60L 53/67* (2019.02); *B60L 55/00* (2019.02); *B60L 53/14* (2019.02); *B60L 2240/72* (2013.01)

(56) References Cited

U.S. PATENT DOCUMENTS

| | | | |
|---|---|---|---|
| 8,731,730 | B2 | 5/2014 | Watkins et al. |
| 8,947,247 | B2 | 2/2015 | Engel et al. |
| 9,026,347 | B2 | 5/2015 | Gadh et al. |
| 9,421,878 | B2 | 8/2016 | Tremblay et al. |
| 9,440,549 | B2 | 9/2016 | Reddy et al. |
| 9,656,567 | B2 | 5/2017 | Kothavale et al. |
| 9,685,798 | B2 | 6/2017 | Appelbaum et al. |
| 9,704,145 | B2 | 7/2017 | Reddy et al. |
| 9,783,072 | B1 | 10/2017 | Reddy et al. |
| 10,000,130 | B2 | 6/2018 | Yuan |
| 10,065,519 | B1 | 9/2018 | Appelbaum |
| 10,693,294 | B2 | 6/2020 | Kearns et al. |
| 10,756,549 | B1 | 8/2020 | Appelbaum et al. |
| 10,836,274 | B1 | 11/2020 | Sun et al. |
| 10,981,464 | B1 | 4/2021 | Sun |
| 11,007,891 | B1 | 5/2021 | Kamal et al. |
| 11,034,253 | B2 | 6/2021 | Vaughan |
| 11,046,186 | B1 | 6/2021 | Appelbaum et al. |
| 11,183,001 | B2 | 11/2021 | Lowenthal et al. |
| 11,198,371 | B2 | 12/2021 | Mailloux |
| 11,211,793 | B1 | 12/2021 | Passmore et al. |
| 11,260,767 | B2 | 3/2022 | Mailloux |
| 11,433,772 | B2 | 9/2022 | Vaughan et al. |
| 11,515,586 | B2 | 11/2022 | Guerra et al. |
| 11,552,500 | B2 | 1/2023 | Rao et al. |
| 11,673,483 | B2 | 6/2023 | Sun |
| 11,724,616 | B2 | 8/2023 | Sun et al. |
| 11,787,304 | B1 | 10/2023 | Passmore et al. |
| 2009/0079388 | A1* | 3/2009 | Reddy .................... G06Q 40/12 |
| | | | 320/109 |
| 2015/0266389 | A1* | 9/2015 | Appelbaum ............ B60L 53/14 |
| | | | 320/138 |
| 2017/0250550 | A1 | 8/2017 | Miftakhov et al. |
| 2021/0276442 | A1 | 9/2021 | Schroeder et al. |
| 2022/0302740 | A1 | 9/2022 | Ambroziak et al. |
| 2023/0044046 | A1 | 2/2023 | Neuenschwander et al. |

\* cited by examiner

SYSTEMS AND METHODS FOR ELECTRIC VEHICLE (EV) MESH CONNECTIVITY AND ENERGY MANAGEMENT

CROSS-REFERENCE

None.

TECHNICAL FIELD

Example embodiments generally relate to the field of electric vehicle (EV) Charging.

BACKGROUND

In recent years, the rapid proliferation of electric vehicles (EVs) has highlighted the need for efficient and scalable infrastructure to support their widespread adoption. As traditional fossil fuel vehicles gradually give way to their electric counterparts, the demand for accessible and reliable charging solutions has surged. However, the integration of EV charging infrastructure into existing buildings presents unique challenges, particularly concerning the management of energy consumption and load balancing. Historically, building owners and operators have faced limitations in deploying EV chargers due to constraints in electrical capacity and concerns over grid stability during peak usage periods.

In response to these challenges, the development of advanced building management systems tailored to accommodate EV charging networks has become paramount. These systems seek to optimize energy utilization, mitigate grid congestion, and enhance the overall efficiency of building operations. By integrating sophisticated load-balancing algorithms and real-time monitoring capabilities, systems can enable the allocation of electrical resources to EV chargers based on factors such as building occupancy, grid demand, and renewable energy availability. Furthermore, the emergence of intelligent building management platforms equipped with user-friendly interfaces empowers building owners and occupants to monitor and manage EV charging activities.

SUMMARY

Example embodiments relate to the field of electric vehicle (EV) Charging. More specifically, example embodiments relate to simplifying the electric vehicle charging experience through a platform integrated with mobile applications and operating systems.

Example embodiments include methods and systems to address the growing need for efficient electric vehicle (EV) charging infrastructure through the implementation of a method for establishing mesh connectivity among EV chargers. By leveraging a mesh network architecture, the method enables communication and coordination between existing EV charging units, a host application, and a user application. Example features include load balancing mechanisms that optimize energy distribution within the building, considering real-time power usage beyond EV charging units. Some embodiments include connectivity to an internet backbone, facilitating communication with user devices such as smartphones and vehicles. Users benefit from remote monitoring, scheduling of charging sessions, and billing functionalities provided through the user application, enhancing overall user experience and system efficiency.

Some embodiments include a set of EV charging units, a hosting application, and a mesh network architecture utilizing Sub-GHz networking. Load balancing mechanisms dynamically adjust power allocation based on real-time usage data, optimizing energy utilization while ensuring reliable charging services. Connectivity to an internet backbone enables efficient communication between charging stations and the hosting application, allowing for real-time monitoring and management of the charging network.

Features of the methods and systems include an integrated energy management system to facilitate efficient electrical load distribution between heat pump systems and EV charging stations. Examples of the methods and systems can include a model-predictive control (MPC) algorithm to accommodate heat pump demand schedules and may incorporate bi-directional EV charging and stationary battery storage systems into the optimization process.

The Model Predictive Control (MPC) may be used to control and predict energy demand schedules of HVAC systems or heat pumps. The goal of the MPC is to optimize a system's performance by predicting future behavior, formulating a control sequence that minimizes a cost function over a finite prediction horizon. Exemplary embodiments include using the MPC to control a building/facility's HVAC/VFD.

Some embodiments include a method for establishing mesh connectivity between electric vehicle (EV) chargers in a network. This method involves configuring a mesh network architecture connecting existing EV charging units, a host application, and a user application, leveraging Sub-GHz networking. Load balancing mechanisms consider building power usage beyond EV charging units, dynamically adjusting power allocation based on real-time usage data. The mesh network is connected to an internet backbone, facilitating communication with user devices such as smartphones and vehicles. Remote monitoring, scheduling of charging sessions, and billing functionalities are provided through the user application. Additionally, some embodiments involve a system for establishing mesh connectivity among EV chargers. This system includes a set of EV charging units, a hosting application, and a mesh network architecture utilizing Sub-GHz networking. Load balancing mechanisms, internet backbone connectivity, and efficient communication between charging stations and the hosting application are integral components of this system.

Figure 1A:
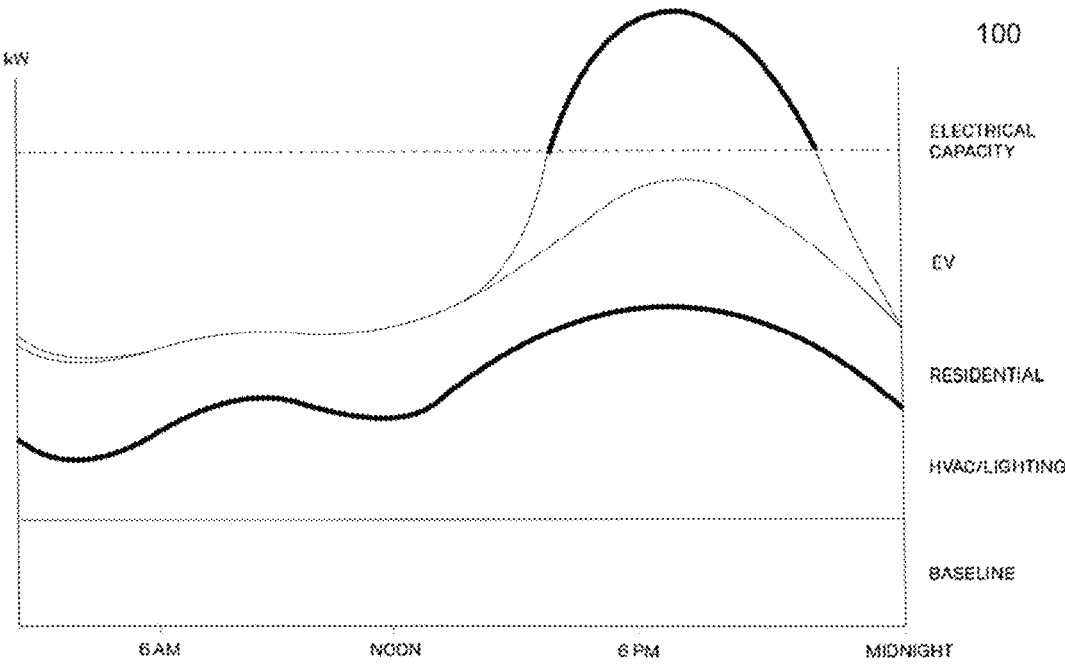
FIG. 1A depicts an example graph for a building with an exceeded electrical capacity.

While the example embodiments are described with reference to the above drawings, the drawings are intended to be illustrative, and the example embodiments contemplate other embodiments within the spirit and scope thereof.

DETAILED DESCRIPTION

Throughout the specification, wherever practicable, like structures will be identified with reference numbers. In some figures, components, such as additional electrical connections or fasteners have been omitted for clarity in the drawings. Unless expressly stated otherwise, the term "or" means "either or both" such that "A or B" includes A alone, B alone, and both A and B together.

Although the example embodiments of methods and systems will be described in terms of various embodiments, it is to be understood that such methods and systems are not intended to be limiting. Various alterations and modifications will be readily apparent to those of skill in the art. Accordingly, it is intended that the appended claims be interpreted as covering all alterations and modifications that fall within the spirit and scope of the example embodiments.

Exemplary embodiments are intended to cover all software or computer programs capable of performing the various heretofore-disclosed determinations, calculations, etc., for the disclosed purposes. For example, exemplary embodiments are intended to cover all software or computer programs capable of enabling processors to implement the disclosed processes. In other words, exemplary embodiments are intended to cover all systems and processes that configure a document operating system to implement the disclosed processes. Exemplary embodiments are also intended to cover any and all currently known, related art or later developed non-transitory recording or storage mediums (such as a CD-ROM, DVD-ROM, hard drive, RAM, ROM, floppy disc, magnetic tape cassette, etc.) that record or store such software or computer programs. Exemplary embodiments are further intended to cover such software, computer programs, systems and/or processes provided through any other currently known, related art, or later developed medium (such as transitory mediums, carrier waves, etc.), usable for implementing the exemplary operations disclosed above.

In accordance with the exemplary embodiments, the example computer programs can be executed in many exemplary ways, such as an application that is resident in the memory of a device or as a hosted application that is being executed on a server and communicating with the device application or browser via a number of standard protocols, such as TCP/IP, HTTP, XML, SOAP, REST, JSON and other sufficient protocols. The example computer programs can be written in exemplary programming languages that execute from memory on the device or from a hosted server, such as BASIC, COBOL, C, C++, Java, Pascal, or scripting languages such as JavaScript, Python, Ruby, PHP, Perl or other sufficient programming languages.

Some of the example embodiments include or otherwise involve data transfer over a network, such as communicating various inputs over the network. The network may include, for example, one or more of the Internet, Wide Area Networks (WANs), Local Area Networks (LANs), analog or digital wired and wireless telephone networks (e.g., a PSTN, Integrated Services Digital Network (ISDN), fiber, a cellular network, and Digital Subscriber Line (xDSL)), radio, television, cable, satellite, and/or any other delivery or tunneling mechanism for carrying data. Network may include multiple networks or subnetworks, each of which may include, for example, a wired or wireless data pathway. The network may include a circuit-switched voice network, a packet-switched data network, or any other network able to carry electronic communications. For example, the network may include networks based on the Internet protocol (IP) or asynchronous transfer mode (ATM), and may support voice using, for example, VoIP, Voice-over-ATM, or other comparable protocols used for voice data communications. In one implementation, the network includes a cellular telephone network configured to enable exchange of text or SMS messages.

Examples of a network include, but are not limited to, a personal area network (PAN), a storage area network (SAN), a home area network (HAN), a campus area network (CAN), a local area network (LAN), a wide area network (WAN), a metropolitan area network (MAN), a virtual private network (VPN), an enterprise private network (EPN), Internet, a global area network (GAN), and Cel-Fi™ so forth. Example embodiments may also include the use of networks such as LoRaWAN™, Wi-SUN™, EnOcean™, io-homecontrol™, ONE-NET, INSTEON™, Z-Wave™, or other Sub-GHz standards-based solutions.

The client and server devices are intended to include or otherwise cover all software or computer programs capable of performing the various heretofore-disclosed determinations, calculations, etc., for the disclosed purposes. For example, exemplary embodiments are intended to cover all software or computer programs capable of enabling processors to implement the disclosed processes. Exemplary embodiments are also intended to cover any and all currently known, related art or later developed non-transitory recording or storage mediums (such as a CD-ROM, DVD-ROM, hard drive, RAM, ROM, floppy disc, magnetic tape cassette, etc.) that record or store such software or computer programs. Exemplary embodiments are further intended to cover such software, computer programs, systems and/or processes provided through any other currently known, related art, or later developed medium (such as transitory mediums, carrier waves, etc.), usable for implementing the exemplary operations disclosed above.

I. Electric Vehicle Charging (Overview)

In the realm of electric vehicle (EV) charging, traditional approaches have primarily focused on hardware solutions, often overlooking the potential of software-driven enhancements. Emerging technologies can be used to reshape this landscape, introducing functionalities to streamline charging processes and enhance user experience.

Example embodiments relate to the field of EV Charging, for addressing the need for streamlined and user-friendly electric vehicle charging platforms and applications. Example embodiments include a platform that incorporates mobile applications and operating systems to simplify the process of charging electric vehicles.

Some embodiments include mobile applications for EV charging management. These embodiments offer users a convenient platform to oversee their charging sessions, including functionalities such as reservations, scheduling, and real-time energy tracking. Additionally, by integrating with overarching operating systems, these applications can provide hosts with tools to set pricing, manage charging access, and enforce policies directly through an app.

Some operating systems dedicated to EV charging management serve as central hubs connecting various components such as charging platforms and management systems. Embodiments may include features such as revenue tracking, resident pricing distinctions, and configurable charging times based on the time of day. These approaches provides hosts with greater flexibility and control over their charging infrastructure.

Some embodiments may use APIs to facilitate the seamless integration of third-party applications and platforms into the EV charging ecosystem. By supporting connections to diverse smart building and energy management platforms, these APIs expand the scope of EV charging solutions beyond traditional boundaries. Some embodiments include the incorporation of vehicle telematics to track energy management by providing detailed insights into EV usage patterns and preferences. This information can help to predict when certain vehicles will need to be charged and help reduce overall load of the system.

In the realm of load balancing, advancements offer intelligent solutions to optimize energy distribution and ensure efficient charging operations. By deploying real-time energy managers alongside EV chargers, these systems prevent grid overloads and contribute to sustainable practices in the electric mobility sector. Some embodiments integrate artificial intelligence (AI) into load-balancing management to further enhance adaptability and efficiency for smarter energy utilization practices. Some embodiments include load balancing devices that can be hooked up to any EV charger network to manage load of the system. Some embodiments may include a built-in load balancing device in every EV charger.

One feature of this system is efficient and user-friendly charging systems that cater to the evolving needs of EV owners. As the demand for EVs continues to rise, ensuring a seamless charging experience becomes paramount to encourage widespread adoption.

One challenge in EV charging infrastructure is the optimization of charging times and efficiency. This includes fast-charging solutions capable of replenishing EV batteries swiftly without compromising their longevity. Example embodiments of high-power chargers and battery management systems can play a role in these aspects.

Example embodiments may also address the issue of interoperability and standardization in EV charging systems. With multiple charging protocols and connector types in use globally, achieving compatibility between different EV models and charging stations is important. Standardization efforts aimed at establishing common charging interfaces and communication protocols facilitate seamless integration and interoperability across diverse charging networks. This not only simplifies the charging experience for EV users but also promotes a robust and interconnected charging infrastructure.

Expanding the availability of charging stations in residential, commercial, and public locations is important for fostering widespread EV adoption. Some embodiments include implementing pricing models that incentivize off-peak charging and promote renewable energy integration can further encourage EV owners to embrace sustainable charging practices. By making EV charging more accessible and cost-effective, the transition to electric mobility can be accelerated, contributing to a greener and more sustainable transportation sector.

In some embodiments, EV chargers operate through a series of intricate processes to efficiently convert AC (alternating current) power from the grid into DC (direct current) power compatible with the vehicle's battery system. The internal workings of EV chargers involve several components and subsystems working together to deliver the required charging power safely and reliably.

At the heart of an EV charger lies the power conversion system, typically consisting of a rectifier and an inverter. The rectifier is responsible for converting AC power from the grid into DC power, which is then fed into the vehicle's onboard charger or directly to the battery pack. This conversion process involves rectifying the incoming AC waveform, smoothing it to produce a steady DC voltage, and regulating it to ensure compatibility with the vehicle's charging requirements.

The inverter, on the other hand, plays an important role in DC fast chargers by converting DC power from the grid into AC power at high frequencies. This high-frequency AC power is then transformed to the required voltage level and fed into the vehicle's battery system. In DC fast chargers, the inverter operates at much higher power levels to facilitate rapid charging, often employing advanced cooling systems to dissipate heat generated during operation efficiently.

Another component of EV chargers is the charging controller, which manages the charging process and communicates with the vehicle to regulate the charging current and voltage. The charging controller monitors various parameters such as battery state of charge, temperature, and voltage levels to optimize charging performance while ensuring the safety and longevity of the battery pack. Additionally, modern EV chargers may incorporate smart charging features, allowing users to schedule charging sessions, monitor charging status remotely, and integrate with renewable energy sources or smart grid systems for enhanced energy management.

Safety features are paramount in EV chargers to protect both the vehicle and the charging infrastructure from potential hazards such as overcurrent, overvoltage, short circuits, and overheating. Multiple layers of protection, including fuses, circuit breakers, ground fault detection, and insulation monitoring, are integrated into EV chargers to mitigate risks and ensure safe charging operations under various conditions.

Some other example embodiments may not need to convert AC to DC for the battery, and the example embodiments can relate to all EVs, EV batteries, EV chargers, EV charging platforms, and EV charging systems. Example embodiments may also be used to charge any type of EV vehicle, including, but not limited to Lithium-ion Batteries, Lithium Iron Phosphate Batteries (LiFePO4), Nickel-Metal Hydride Batteries (NiMH), Solid-State Batteries, Sodium-Ion Batteries, Zinc-Air Batteries, Supercapacitors, Lithium-Sulfur Batteries, Aluminium-Ion Batteries, Flow Batteries, etc.

Example embodiments may relate to but are not limited to the EV charging of any of the following vehicles: Cars: Tesla Model S, Nissan Leaf, Chevrolet Bolt EV, BMW i3, Hyundai Kona Electric, Audi e-tron, Jaguar I-PACE, Porsche Taycan, Rivian R1T, Lucid Air, Ford Mustang Mach-E, Volkswagen ID.4, Kia Soul EV, Renault Zoe, Honda Clarity Electric, Mercedes-Benz EQC, Volvo XC40 Recharge, Polestar 2, Mini Cooper SE, Fiat 500c, Tesla Model X, Tesla Model 3, Chevrolet Spark EV, Smart EQ Fortwo, Byton M-Byte, Faraday Future FF91, NIO ES6, NIO ES8, Xpeng G3, Xpeng P7, Fisker Ocean, Bollinger B1, Bollinger B2. Motorcycles: Zero SR/F, Harley-Davidson Live Wire, Lightning Strike, Energica Ego, Cake Kalk&. Bicycles: VanMoof S3 & X3, Cowboy 3, RadRover 6 Plus, Trek Powerfly FS, Specialized Turbo Vado SL, Cannondale Tesoro Neo X, Juiced Bikes RipCurrent S, Riese & Müller Load 75. Scooters: Xiaomi Mi Electric Scooter, Segway Ninebot MAX, Razor E300S, Unagi Model One, Apollo City, Boosted Rev, Bird One, Nanrobot D6+, or any other electric scooter. Boats: SoelCat 12, Duffy 16, X Shore Eelex 8000, Silent Yachts Silent 55, Candela C-7. Planes: Eviation Alice, Bye Aerospace eFlyer 2, Pipistrel Alpha Electro, Airbus E-Fan X, Lilium Jet. Helicopters: eVTOL, or any other current or future electric vehicles of any kind.

In some embodiments, the energy in Electric Vehicle (EV) batteries is stored in the form of chemical energy. In lithium-ion batteries, for instance, this energy is stored within the electrode materials, typically lithium compounds such as lithium cobalt oxide, lithium iron phosphate, or lithium manganese oxide. During charging, electrical energy from an external power source is converted into chemical energy through reversible electrochemical reactions. Lithium ions are transferred between the positive and negative electrodes (cathode and anode) of the battery, accompanied by the movement of electrons through the external circuit, thus storing energy within the battery cells.

When an EV is in operation, the stored energy in the battery is utilized to power the electric motor(s) that drive the vehicle. This process involves the conversion of chemical energy back into electrical energy through electrochemical reactions within the battery cells. As the battery discharges, lithium ions migrate from the anode to the cathode through an electrolyte solution, releasing electrons in the process. These electrons flow through the external circuit, powering the electric motors and providing the necessary torque to propel the vehicle.

The electric motors in an EV convert electrical energy into mechanical energy, driving the wheels and propelling the vehicle forward. Unlike internal combustion engines found in conventional vehicles, electric motors operate without the need for combustion and produce instant torque, providing responsive and efficient acceleration. The speed and power output of the electric motor(s) are controlled by the vehicle's powertrain system, which regulates the flow of electrical current from the battery to the motor(s) based on driver input and operating conditions.

As the vehicle operates, the battery gradually discharges, depleting its stored energy. To replenish the battery's energy and extend the vehicle's driving range, the EV must be connected to an external power source for charging. During charging, electrical energy from the grid is transferred to the battery, reversing the electrochemical reactions that occur during use. This process restores the battery's chemical energy, allowing it to store energy for future use and enabling the EV to continue operating efficiently and sustainably.

II. Operating System for Hosts

Some embodiments include an operating system for hosts. This operating system is herein referred to as a "host application" or "host platform". Some embodiments encompass a host application/platform for the efficient management of electric vehicle (EV) charging networks. Some embodiments may include direct management of buildings containing EV chargers. This system provides a centralized solution tailored to the needs of hosts, enabling them to oversee and optimize charging infrastructure across multiple locations. With its advanced features and functionalities, the host application/platform empowers hosts to remotely monitor, control, and administer charging operations, enhancing efficiency, profitability, and user experience. The system manages EV charging networks through dynamic pricing, scheduling options, and direct payment integration. This drives user engagement, and facilitates the transition toward sustainable transportation solutions.

The host application/platform is a management system to oversee and optimize the operation of electric vehicle (EV) charging networks. It provides hosts, such as charging station operators or property managers, with a centralized platform to monitor, control, and administer charging infrastructure across multiple locations. This application offers a range of features and functionalities tailored to meet the diverse needs of hosts in efficiently managing their charging networks. From dynamic pricing and scheduling options to real-time monitoring and analytics, the host application/platform empowers hosts to maximize the efficiency, availability, and profitability of their EV charging services. In some embodiments, these "locations" may pertain to a single floor of a building, multiple floors of a building, or multiple buildings. Some embodiments may include a single host managing EV chargers in different buildings through a single account on the application.

Users would want to use the host application/platform because it offers convenience and flexibility in managing charging operations, allowing hosts to remotely monitor and control charging stations from anywhere with internet access. This remote management capability enables hosts to respond promptly to operational issues, optimize charging schedules, and ensure a seamless experience for EV owners. The application also provides hosts with valuable insights and analytics on charging station usage, energy consumption, and revenue generation, enabling data-driven decision-making to improve overall performance and profitability. Some embodiments may include selling this data to data brokers or other organizations.

The host application/platform may include dynamic pricing, reservation systems, and user incentives, which can enhance user experience and encourage optimal utilization of charging infrastructure. By offering advanced functionalities such as direct payment integration and user authentication, the application streamlines the charging process for EV owners, reducing friction and enhancing accessibility to charging services.

Some embodiments include features for hosts to manage EV charging across an entire network of chargers efficiently and effectively. These features enable hosts to prioritize charging for specific vehicles based on criteria such as membership level or vehicle type, ensuring that critical vehicles receive charging priority when needed. Additionally, hosts can implement dynamic pricing models to vary charging rates based on factors such as time of day or demand, encouraging users to charge during off-peak hours and optimizing energy consumption across the network.

Some embodiments include functionalities to discourage loitering at charging stations by imposing additional fees for vehicles that remain connected after reaching full charge or for those parked without actively charging. By incentivizing users to vacate charging spots promptly, hosts can minimize congestion at stations and maximize accessibility for other EV owners. Some embodiments may also include slowing down or stopping charge to a vehicle that is parked or longer than a limit set by the host.

Normally, people can move their vehicle from one spot to another to reset the allotted time for parking their vehicle in a certain area. This stops them from having to pay fees or a fine for parking their vehicle for longer than the limit. Whenever the limit is reached, people can move to a different spot to avoid a ticket. To counteract this, some embodiments include tracking the location and charging time of certain vehicles by tracking the vehicle with an ID. This may stop users from moving their vehicle to a neighboring spot to reset the charging time limit placed by a host. This ID can be a username, license plate, or other ID number given to a user or a vehicle for tracking their EV charging habits.

Some embodiments provide users with scheduling options, allowing them to book charging sessions in advance through the application. This feature enables hosts to allocate resources more efficiently, reduce wait times for users, and manage peak demand periods effectively. Additionally, reservation systems can be implemented to guarantee charging slots for users at specific times, enhancing user experience and convenience.

Some embodiments offer real-time monitoring and alerts for hosts, providing insights into charging station usage, equipment status, and potential issues. Hosts receive notifications regarding anomalies such as inactive vehicles, faulty equipment, or power outages, enabling prompt action to resolve issues and ensure uninterrupted service for users.

Some embodiments include comprehensive analytics and reporting tools for hosts, offering insights into charging patterns, user behavior, and revenue generation. This information empowers hosts to make data-driven decisions to optimize charging infrastructure, improve user experience, and maximize profitability across the network.

Some embodiments seamlessly integrate with user applications for direct payment, eliminating the need for users to pay at the physical charging station. This streamlined payment process enhances user convenience and simplifies transaction management for hosts, promoting a seamless and frictionless charging experience for EV owners. Some embodiments still include users paying at the physical EV charging station before or after the charging session. Some embodiments include the use of wireless or automatic EV chargers that charge a vehicle based on proximity to the charger. Other embodiments include tracking an ID of a user or vehicle and providing a charge to the vehicle based on a matching ID. This prevents users who are not associated with a specific charger from charging their vehicles on a private charger. Hosts can set up public and private chargers through the application/platform.

Some embodiments include cloud-based technology. The cloud-based platform offers access to critical data and functionalities, ensuring flexibility and scalability for hosts of all sizes. By harnessing the power of the cloud, the platform facilitates real-time monitoring and control of EV charging stations, allowing hosts to track relevant metrics such as revenue and energy usage on a vehicle-by-vehicle basis. The information gathered may be stored in the cloud or on a private server accessible to the host.

One of the standout features of this host platform is its precise access control capabilities, which empower hosts to manage user access of EV chargers. This may include granting access to designated users, implementing customizable access schedules, or enforcing access restrictions.

In some embodiments, the platform offers customizable charging rate structures, giving hosts the flexibility to tailor pricing models according to their business objectives and user preferences. Hosts can optimize revenue generation, enhance charging station utilization, and mitigate loitering by setting dynamic fee structures based on factors such as energy consumption or charging duration. With built-in loitering enforcement mechanisms, hosts can deter unauthorized usage and ensure fair access to charging facilities for all users.

In some embodiments, each EV charger within the network can be configured as private, public, shared, or a combination. This offers flexibility to accommodate diverse user needs and property requirements. The platform allows hosts to customize charging infrastructure to suit the specific needs of their properties. This provides dedicated charging stations for residents in private parking spaces or offering shared charging facilities for visitors in mixed-use areas. For example, a tenant building may need private spaces for EV charging because users may need to charge their vehicles overnight. On the other hand, public garages may want to have public chargers to allow anyone who is there at the time to charge their vehicles in any open spot. In some embodiments, users may allow others to share their charging spots by entering a new vehicle in the platform/application.

Hosts have full control over the design, management, and customization of each EV charger, empowering them to optimize charging infrastructure according to property-specific requirements and user demand. Some embodiments include dedicated parking space access or deploying shared charging facilities in high-traffic areas.

Some embodiments may include the integration of real-time building energy monitoring and EV charging coordination into the host platform by interfacing with industry-standard protocols such as BACnet, Modbus TCP/IP, and IEEE2030.5. By leveraging these protocols, the platform gains the capability to monitor energy consumption within buildings and orchestrate EV charging operations in alignment with dynamic energy demand and availability. Through BACnet integration, hosts can access detailed insights into building energy usage to optimize energy efficiency and minimize costs.

Some embodiments may include Modbus TCP/IP integration and/or IEEE2030.5 integration. Modbus TCP/IP empowers the host platform to communicate directly with diverse building systems and devices, enabling the collection of real-time data on energy consumption patterns and system performance. This granular level of monitoring facilitates proactive energy management strategies, including load balancing and demand response, to ensure efficient operation of both the building infrastructure and EV charging stations. IEEE2030.5 integration enhances interoperability with utility networks and renewable energy sources, enabling hosts to synchronize EV charging schedules with renewable energy generation profiles and grid conditions for maximum efficiency and sustainability.

Some embodiments may include the incorporation of fully customizable reporting dashboard views into the host platform, leveraging data from industry-leading platforms such as Measurabl, Yardi, AutoGrid, and EnergyHub. By integrating with these platforms, the host platform can provide real estate partners with tailored reporting solutions that align precisely with their needs and preferences. This level of customization enables hosts to generate insightful reports on EV charging usage, energy consumption, and cost savings, facilitating informed decision-making and effective resource allocation.

With Measurabl integration, hosts gain access to comprehensive sustainability reporting capabilities, allowing them to track key performance indicators related to EV charging infrastructure and building energy management. Integration with Yardi provides seamless access to property management data, enabling hosts to correlate EV charging activity with property occupancy rates and tenant behavior. AutoGrid and EnergyHub integration can enhance the host platform's ability to analyze grid data and optimize EV charging schedules based on real-time energy demand and pricing signals. This comprehensive approach to reporting and data analysis empowers hosts to maximize the value of their EV charging networks while ensuring compliance with energy utility requirements and sustainability goals.

Some embodiments may include the implementation of natural language processing (NLP)-enabled report generation within the host platform, leveraging integrations with leading platforms such as Quaeris and GPT-4. By harnessing the capabilities of NLP technology, the host platform can streamline the process of generating environmental, social, and governance (ESG) reports, as well as energy usage reports. Through Quaeris integration, the platform gains access to advanced NLP algorithms that can analyze data inputs from EV charging networks and other sources to automatically generate comprehensive reports in a human-readable format. This automation reduces the manual effort required for report generation and ensures consistency and accuracy across reporting outputs.

Some embodiments include integration with ChatGPT to enhance the host platform's ability to understand and interpret unstructured data, such as textual descriptions of EV charging activities and energy usage patterns. GPT-4's state-of-the-art NLP capabilities enable the platform to extract meaningful insights from large volumes of text data, allowing hosts to gain deeper insights into EV charging trends, user behavior, and energy consumption patterns. By automating the report generation process and leveraging NLP technology, the host platform empowers hosts to efficiently manage their EV charging networks while meeting regulatory reporting requirements and sustainability objectives. Some embodiments include integration with other large language models (LLMs) or NLP technologies.

Some embodiments may include the incorporation of real-time user-configurable grid-services participation features within the host platform, offering real estate partners full control over building ancillary service participation. Through this functionality, hosts can dynamically adjust their buildings' participation in grid services such as demand response, frequency regulation, and peak shaving to optimize energy usage. By providing user-configurable settings, the platform enables real estate partners to tailor their grid-services participation strategies based on their specific energy needs, operational preferences, and financial objectives.

III. User Application and Platform

Some embodiments introduce a user application to complement the host platform for electric vehicle (EV) charging networks. This application, herein referred to as the "user app", or "user application" delivers a first-class charging experience for EV drivers, offering great convenience, flexibility, and accessibility. By seamlessly integrating with the host platform, the user app empowers EV owners to manage their charging needs efficiently and effectively, ensuring they receive the charge they need, when they want it, and how they want it. Some embodiments are for a standalone application, the host platform is not a necessary component of the user application.

Embodiments include account management features. The user app allows EV drivers to create and manage their profiles, set up a username, password, and enter vehicle information for one or more vehicles. Users can customize their settings, preferences, and payment methods, providing a personalized charging experience tailored to their individual needs and preferences. The app may also offer flexible payment methods, enabling users to pay for charging services conveniently using their preferred payment options without having to pay through the physical EV charging station.

Some embodiments include reservation and scheduling functionalities. Reservation and scheduling functionalities enable EV drivers to plan and book charging sessions in advance, ensuring they have access to charging infrastructure when needed. Some embodiments may include the option for users to pay a higher fee to charge their vehicles faster during peak hours. This feature allows users to prioritize faster charging when demand on the charging network is high, ensuring they can quickly replenish their vehicle's battery even during busy periods. By offering this premium service, the user platform provides flexibility and convenience to users who require rapid charging, while also generating additional revenue for the charging network operator. Users willing to pay a premium can benefit from reduced wait times and increased accessibility to fast charging stations, enhancing their overall charging experience and satisfaction.

Real-time energy tracking capabilities allow EV drivers to monitor their energy usage and charging progress in real-time, providing transparency and insight into their charging activities. With access to comprehensive energy consumption data, users can make informed decisions to optimize their charging habits, minimize costs, and reduce environmental impact. Some embodiments may include AI-generated suggestions to users to help them cut down on their energy usage costs. These may include suggesting a user certain times to charge their vehicle based on usage rates or peak hours. In some embodiments, the user app offers 24/7 customer and technical support, ensuring that EV drivers receive assistance and guidance whenever needed.

Some embodiments extend the user application's reach by integrating it into the physical interface of electric vehicles (EVs). This approach enables EV drivers to access and interact with the application directly from their vehicle's dashboard or infotainment system, creating a seamless and intuitive user experience.

By integrating the application into the vehicle's interface, EV drivers can access features and functionalities directly through their vehicles interface. One of the features of integrating the application into the vehicle's interface is enhanced convenience and accessibility. EV drivers can access the application's features without the need to handle additional devices or switch between different screens, minimizing distractions while driving.

The integration of the application into the vehicle's interface enhances safety by promoting hands-free interaction. Through voice commands or touchscreen controls, EV drivers can access the application's functionalities without taking their eyes off the road or hands off the steering wheel, ensuring a safer and more intuitive user experience. Integrating the application into the vehicle's interface enables seamless communication and synchronization between the user's EV and the charging network. Users can receive real-time updates and notifications directly on their vehicle's dashboard, keeping them informed about charging station availability, charging progress, and other relevant information while on the move.

In some embodiments, the user application connects to the host application, facilitating various functionalities such as direct payment, fee management, scheduling, and optimized charging based on peak or off-peak hours to conserve energy and reduce costs.

Through the integration with the host application, EV drivers can conveniently initiate and manage payment transactions directly from their mobile devices. Securely authorizing payments through the user application eliminates the need for physical payment methods or manual transactions at the charging station. Users can settle additional fees, access membership benefits, and pay for charging sessions seamlessly.

The user application provides flexible scheduling options, allowing EV drivers to plan and book charging sessions according to their preferences and needs. By accessing the host application's scheduling features, users can reserve charging slots in advance, ensuring availability during peak hours or high-demand periods. Additionally, users can optimize their charging schedules to take advantage of off-peak hours, allowing for lower energy costs and reducing overall charging expenses.

The integration between the user and host applications also enables dynamic fee management, allowing hosts to implement customized pricing structures based on various factors such as time of day, charging duration, membership status, or vehicle type. EV drivers can view and accept fee structures directly through the user application, providing transparency and flexibility in managing charging expenses. the user application leverages real-time data and insights from the host application to optimize charging behavior and conserve energy. By analyzing demand patterns and energy consumption metrics, users can receive recommendations on the best times to charge their EVs to minimize costs and support grid stability. Some embodiments include intelligent charging algorithms that can adjust charging schedules dynamically based on grid conditions and renewable energy availability.

Some embodiments of the example system incorporate ISO 15118 capabilities into the EV chargers/user platform, enhancing the interoperability and security of electric vehicle (EV) charging infrastructure. ISO 15118-20 enables bidirectional communication (bidirectional power transfer) between EVs and charging infrastructure.

At its core, ISO 15118 empowers EVs and charging stations to dynamically exchange information, negotiate charging parameters, and ensure grid-friendly charging practices. One of its features is Plug & Charge technology, which establishes secure communication channels between EVs and charging stations. This technology leverages cryptographic mechanisms to safeguard data integrity, confidentiality, and authenticity, protecting against potential security threats and unauthorized access. ISO 15118 also facilitates user convenience through automated authentication and authorization processes. With Plug & Charge, EVs can automatically identify themselves to charging stations, eliminating the need for manual authentication methods such as RFID cards or mobile apps. This streamlined approach simplifies the charging experience for EV owners, reducing friction and enhancing accessibility to charging infrastructure.

Additionally, ISO 15118 supports vehicle-to-grid (V2G) communication, enabling bidirectional energy transfer between EVs and the grid. This capability opens up new opportunities for grid stabilization, demand response, and renewable energy integration. By leveraging ISO 15118 capabilities, EVs can not only consume energy from the grid but also feed surplus energy back into the grid when needed, effectively becoming mobile energy storage units.

Incorporating ISO 15118 capabilities into EV charging infrastructure enhances interoperability, security, and functionality, paving the way for a smarter and more sustainable transportation ecosystem. With Plug & Charge technology, automated authentication processes, and support for V2G communication, ISO 15118 empowers EVs and charging stations to communicate seamlessly, optimize energy usage, and contribute to grid stability and resilience. As the adoption of electric mobility continues to grow, ISO 15118 plays an important role in shaping the future of transportation and energy management.

Some embodiments of the example system may also integrate Autocharge+ capabilities, revolutionizing the electric vehicle (EV) charging experience by introducing automated convenience and seamless functionality. Autocharge+ eliminates the need for manual intervention in the charging process, streamlining the user experience from start to finish. Unlike Plug & Charge, which may still require users to initiate the charging session through mobile apps or payment methods, Autocharge+ automates the entire process. Upon connecting the EV to a compatible CCS charger, Autocharge+ identifies the vehicle through a unique identification number (UIN) and associates it with the user's account instantaneously.

A feature of Autocharge+ lies in its time efficiency. By initiating the charging process immediately upon plugging in the EV, Autocharge+ eliminates delays and complexities associated with traditional methods. Users no longer need to navigate through mobile apps or manage physical cards, ensuring a hassle-free experience that prioritizes convenience and simplicity. Autocharge+ enhances user experience by offering a level of automation and efficiency that redefines expectations in EV charging. Autocharge+ simplifies the charging process, saving time and eliminating unnecessary steps. Some embodiments may integrate the system at home, work, public, or private charging stations. Other buildings are also possible.

Some embodiments may include an iOS and Android mobile application, offering users access to full native mobile functionality for seamless integration with their mobile devices. This application enables EV owners to manage their charging sessions, access real-time charging station availability, and track their charging history directly from their smartphones. Some embodiments include integration with Apple CarPlay and Android Auto, users can conveniently interact with the application while driving.

In some embodiments, the mobile app integrates with digital wallet platforms such as Apple Wallet and Google Pay, allowing users to make secure and convenient payments for charging sessions without the need for physical payment methods. By leveraging these digital payment solutions, EV owners can streamline the charging process, eliminate the hassle of carrying cash or cards, and enjoy greater flexibility and convenience when accessing charging infrastructure. The integration of mobile wallet functionality enhances the overall user experience by offering easy payment methods and reducing transaction times at charging stations.

IV. Load Balancing Software

In the realm of electric vehicle (EV) charging infrastructure, a challenge lies in optimizing energy distribution while mitigating the risk of grid overload and ensuring uninterrupted charging services. Some embodiments of the system introduce an intelligent real-time energy management solution. This system includes load-balancing software, integrated into panel metering devices connected to a system/ network of EV chargers. The load-balancing software functions as an autonomous energy arbiter, orchestrating charging sessions to ensure optimal power consumption and alleviate undue strain on the electrical grid.

Some embodiments include dynamically apportioning the load across multiple charging units, and protecting against grid overload, guaranteeing equitable and efficient allocation of available power resources. This not only insulates against potential disruptions in charging services but also bolsters the dependability and robustness of the entire EV charging infrastructure.

Moreover, with the load balancing software vigilantly monitoring the operational status of chargers round the clock, hosts are empowered with unparalleled 24/7 technical support, ensuring expedient identification and resolution of any hardware anomalies or malfunctions.

Traditionally, the number of EV chargers a building can handle is restricted by its electrical capacity. But with load management, the software bypasses this limitation, making it possible to deploy more chargers efficiently. By optimizing resource use and improving operational efficiency, some versions of this software promote the adoption of electric mobility solutions in urban areas. This helps create a sustainable transportation infrastructure that's effective and scalable.

Exemplary embodiments may include an integrated energy management system to facilitate efficient electrical load distribution between heat pump systems and EV charging stations. Examples of the methods and systems can include a model-predictive control (MPC) algorithm to accommodate heat pump demand schedules and incorporates bi-directional EV charging and stationary battery storage systems into the optimization process.

Model Predictive Control (MPC) may be used to control and predict energy demand schedules of HVAC systems or heat pumps. The goal of MPC is to optimize a system's performance by predicting future behavior, formulating a control sequence that minimizes a cost function over a finite prediction horizon. Exemplary embodiments include using the MPC to control a building's HVAC/VFD.

Some embodiments of the load balancing software function as an intelligent gatekeeper, orchestrating the flow of energy to EV chargers based on real-time demand and available resources. By employing AI/ML algorithms and predictive analytics, the system dynamically adjusts charging parameters to accommodate fluctuations in energy consumption and prevent grid congestion or overload. This proactive approach not only ensures optimal charging performance for individual EVs but also syncs the charging infrastructure and the electrical grid. Some embodiments of the load balancing software integrate with existing building management systems and smart grid technologies, facilitating interoperability and data exchange to further enhance energy efficiency and sustainability initiatives. Some embodiments include uploading the software to currently deployed EV chargers in a current system. Some embodiments include adding a wired or wireless device to each EV charger to manage the load on each charger. Some embodiments include adding a device to each network of EV chargers to measure the load of the total devices.

Another aspect of some embodiments of the load balancing software is their ability to provide granular insights into charging patterns, energy consumption trends, and grid utilization metrics. Through comprehensive data analytics and reporting features, hosts can gain valuable intelligence to optimize charging schedules, forecast future demand, and identify potential areas for improvement. Some embodiments of the system offer advanced diagnostic capabilities, allowing hosts to remotely troubleshoot issues, perform preventive maintenance, and ensure the seamless operation of EV charging infrastructure. By harnessing the power of data-driven decision-making, hosts can unlock new opportunities for efficiency gains, cost savings, and environmental stewardship in the realm of electric mobility.

Some embodiments include the software's capability to analyze all available energy within the building and intelligently manage the charge on EV charging devices based on the energy consumption of other devices that are present, such as HVAC systems, lighting fixtures, elevators, and machinery. By monitoring the energy usage patterns of these various devices in real-time, the software can dynamically adjust the charging rates of EV chargers to ensure that the building's electrical capacity is optimally utilized without exceeding its limits. For example, during peak hours when the demand for electricity is high due to increased HVAC usage and lighting requirements, the software may prioritize slower charging rates for EVs to prevent strain on the grid. Conversely, during off-peak hours when energy demand is lower, the software can allocate more power to EV chargers to accelerate charging speeds without compromising the building's overall energy stability. This adaptive load management approach maximizes the efficiency of energy utilization across the building while ensuring that EVs receive the charge they need, thereby enhancing the overall sustainability and functionality of the electrical infrastructure.

Figure 1B:
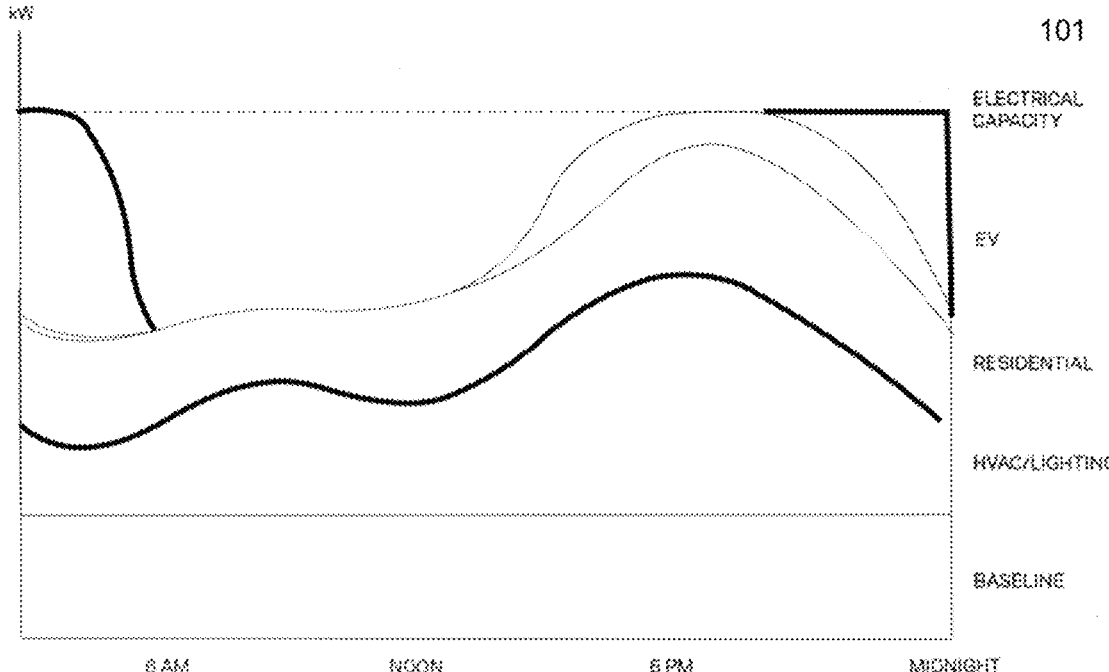
FIG. 1B depicts an example graph for a building using the load balancing software to prevent an exceeded electrical capacity.

FIG. 1A depicts an example graph 100 for a building with an exceeded electrical capacity. FIG. 1B depicts an example graph 101 for a building using the load balancing software to prevent an exceeded electrical capacity. These graphs show an example of a standard day with kW/time. FIG. 1A shows that without load management, the number of EV chargers that can be installed is limited by the building's electrical capacity. This would result in an overloaded circuit causing the circuit breaker to trip, or for power to be shut off for that part of the building. FIG. 1B shows that with the load balancing software, there is no risk of exceeding the building's electrical capacity, allowing for up to 10× the EV chargers to be installed. FIGS. 1A and 1B include a baseline kW for the building, the HVAC/lighting systems, which are higher during peak hours, and the residential use, which is higher during peak hours. With the load balancing software, the EVs may be charged less efficiently during peak hours, and more efficiently during peak hours.

Some embodiments include the implementation of bi-directional charging capabilities, enabling the system to utilize power stored in EV batteries to supplement the building's energy needs in scenarios where the electrical capacity is exceeded due to high demand from HVAC/lighting systems and residential usage. In such situations, where the building's energy consumption approaches or surpasses its capacity limits, the load balancing software intelligently manages the flow of electricity, prioritizing critical building functions while optimizing energy usage. By tapping into the energy stored in EV batteries during peak demand periods, the software ensures that essential building operations remain unaffected, mitigating the risk of circuit overload or power disruptions. This bi-directional charging functionality not only enhances the resilience and reliability of the building's energy infrastructure but also contributes to cost savings by reducing reliance on grid power during peak hours.

Figure 2:
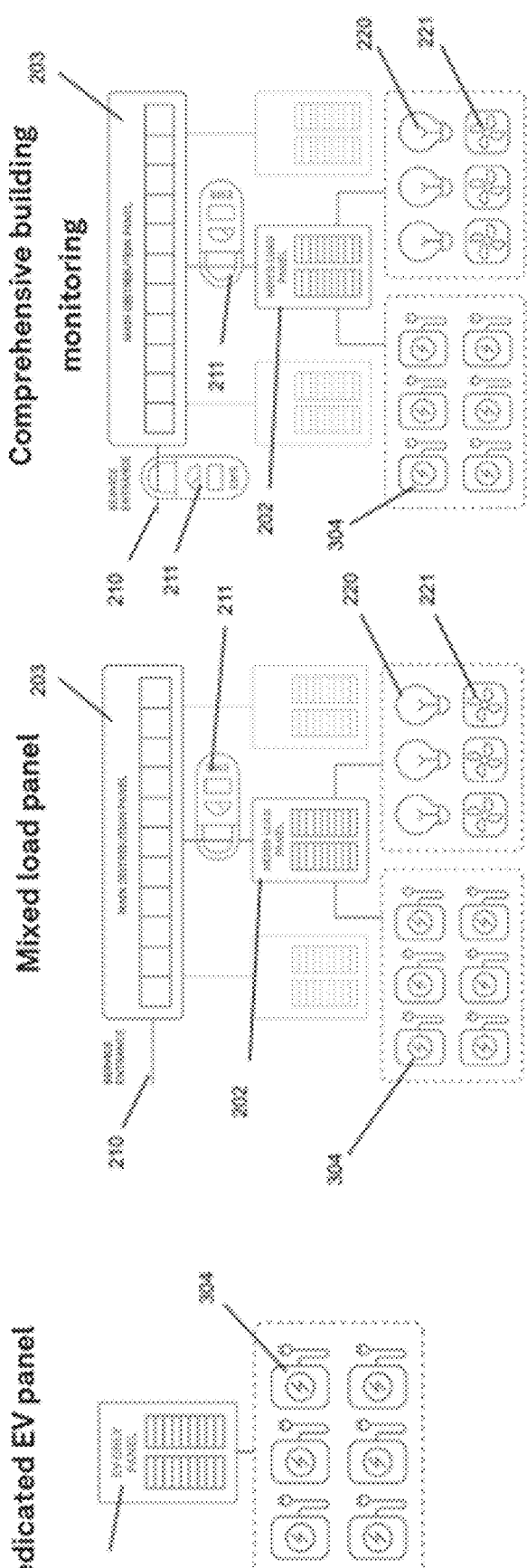
FIG. 2 depicts three example configurations that maximize building electrical infrastructure capacity.

FIG. 2 depicts three example configurations of a building energy management system that maximize building electrical infrastructure capacity. The first example configuration is for a dedicated panel for EV chargers. FIG. 2 provides examples of different facility layouts. These layouts include a 1) single dedicated EV panel 201 with EV chargers 304, 2) a mixed load panel configuration with an EMS 211 between the mixed load panel 202 and the main distribution panel 203, and 3) a comprehensive building monitoring system with an additional EMS 211 on the service entrance 210. The second and third configurations also include energy from lights 220 and HVAC 221 going through the mixed load panel 202, EMS 211, and main distribution panel 203. This would include load balancing for only the EV chargers and would not prioritize conserving energy for the rest of the building. This configuration is best used with a lower amount of EV chargers. The second configuration is the mixed load panel which includes an energy management system (EMS) between the main distribution panel and the mixed load panel. The mixed load panel controls the amount of energy going to the EV chargers, and balances energy load between EV chargers, lights, and HVAC unit. The third configuration of the building monitoring system is similar to the mixed load panel of the second example configuration, but includes another EMS at the service entrance. This allows the EMS to monitor the cost of energy in real-time and charge EVs faster when energy prices are lower. Some embodiments may include adding cost to the user during peak hours or "surge pricing".

Some embodiments may pertain to a program(s) containing the load balancing software. Some embodiments include using the load balancing software on an electronic device, the electronic device may pertain to a user device, smartphone, tablet, computer, vehicle interface, etc.

The program is configured to communicate with a management system for a facility or building having a related network of electric vehicle (EV) chargers. the EV chargers may be capable of bi-directional charging, and the network may include communication through Sub-GHz RF.

The program may include receiving total load data from the facility, the total load data may pertain to a desired total energy load of the facility. This desired load may pertain the maximum energy capacity of the facility. It may also pertain to the maximum energy capacity minus a given amount to allow for uncertainty when calculating the total power available to the EV chargers. This desired energy load may also pertain to an amount decided upon by the host/facility manager.

The program may include receiving actual element load data relating to a load of at least one element related to the facility. Some embodiments may include the element being an HVAC system, the facility lights, resident electronic devices, large industrial equipment, or any other equipment or devices that use the facility's power. The term "actual" element load data refers to the amount of power being used by the element at the time. This data does not need to be exactly equivalent to the real-time energy and is used to estimate the total energy that each element in the system is using. This actual element load data may pertain to a single element in the facility, multiple elements in the facility, or all of the elements in the facility.

The program(s) may also determine a leftover power available to the network of EV chargers based on the difference between the total load data and the actual element load data.

The program(s) may control the total power available to the network of EV chargers based on the determined leftover power. This may controlled by one of a circuit breaker, switch, relay, contactor, variable frequency drive (VFD), programmable logic controller (PLC), and power controller.

In some embodiments, the facility may include a building, tenant building, parking garage, office complex, residential complex, industrial facility, etc.

V. Bi-Directional EV Charging

Enabling bidirectional energy flow between Electric Vehicle (EV) batteries and the building grid necessitates a bi-directional EV charger equipped with the requisite hardware and software functionalities. This charger must possess bidirectional power electronics capable of converting DC power from the battery to AC power for grid connection and vice versa, facilitating both charging and discharging operations. Moreover, it should incorporate communication protocols enabling seamless interaction between the EV battery, charger, and the building energy management system. These protocols, often referred to as Vehicle-to-Grid (V2G) communication, allow the charger to receive signals from the building grid about peak energy demand periods, thereby adjusting charging and discharging schedules accordingly.

A component of a bi-directional EV charging system is the energy management software of the building energy management system that allows for the bidirectionality energy flow between the building, EV chargers, and EV batteries. This software analyzes real-time grid conditions, energy prices, and building energy demand patterns to optimize charging and discharging schedules for maximum efficiency and cost savings. Additionally, adherence to relevant safety standards and regulations is important to ensure the integrity of the building grid and the safety of both the EV and building occupants. Some embodiments of the energy management software include features such as anti-islanding protection to prevent unintended energy backflow during grid outages, enhancing system safety.

Some embodiments of the building energy management system include a Battery Management System (BMS). The BMS plays a vital role in monitoring and controlling the state of charge, temperature, and overall health of the EV battery during charging and discharging operations. The BMS optimizes battery performance, protects against over-charging/discharging, and ensures the longevity of the battery pack. Some embodiments may include integration with renewable energy sources such as solar panels or wind turbines installed on the building premises to further enhance the BMS's sustainability. By utilizing renewable energy to charge the EV battery during off-peak times and exporting excess energy back to the grid during peak demand periods, the BMS contributes to a more efficient and sustainable energy ecosystem. This allows for extra cost savings for the building owners or hosts.

Some embodiments of the building's energy management system include the use of a Variable Frequency Drive (VFD). Integrating a bi-directional charging system with a variable frequency drive (VFD) introduces an additional layer of efficiency and flexibility to the EV charging process. A VFD controls the frequency and voltage of the AC power supplied to the EV charger, allowing for precise adjustment of the charging rate and power factor correction. By dynamically adjusting the frequency and voltage output based on real-time grid conditions and energy demand, the VFD optimizes the charging process for maximum efficiency and stability. When coupled with bi-directional charging capabilities, the VFD enables seamless transition between charging and discharging modes, facilitating grid balancing and demand response. This integrated approach not only enhances the reliability and resilience of the electrical infrastructure but also maximizes the utilization of renewable energy resources by intelligently managing energy flow between EV batteries, the grid, and renewable energy sources. Example embodiments include using the VFD in an HVAC system, for example to circulate a circulation medium such as air, coolant, or water.

VI. Connect API (Third Party Management Platform)

Example embodiments include an API solution which can facilitate the integration of electric vehicle (EV) charging infrastructure with smart building and energy management platforms. This API, referred to as the "Connect API" or "Connect Platform," provides a seamless interface for communication and collaboration between EV charging systems and various smart building and energy management systems. Through the Connect API building owners and grid operators can unlock ecosystem benefits by optimizing energy usage, reducing costs, and enhancing overall building efficiency. The use of "Connect API" is not meant to limit the example embodiments, and any mention of "Connect API" can refer to any API that connects any number of platforms and applications to an EV charging infrastructure, system, or network.

The Connect API serves as a versatile interface that connects EV charging infrastructure with smart building and energy management platforms, enabling efficient data exchange and coordination. Building owners can leverage real-time data and insights from EV charging operations to optimize energy usage, reduce costs, and improve overall building efficiency. Grid operators benefit from enhanced visibility into charging demand patterns and grid dynamics, enabling more effective grid management and capacity planning.

One feature of the Connect API is its compatibility with a wide range of smart building and energy management platforms. This compatibility allows for seamless integration and interoperability with various systems and devices, including building automation systems, energy monitoring platforms, and demand response solutions. The Connect API provides a unified interface for streamlined communication and collaboration across diverse systems and devices.

In some embodiments, the Connect API integrates with third-party applications, expanding its functionality and versatility. This integration enables users to leverage additional features and services to enhance their EV charging experience, further improving overall efficiency and user satisfaction. The Connect API may also integrate with smart building and parking apps, thanks to its smart API and structured data library. This ensures compatibility and seamless interaction with existing building management systems, providing a cohesive and user-friendly experience for building owners and operators. Some embodiments may not include integrating with third-party applications.

Some embodiments of the Connect API may include support for Cell-Fi, Mesh, or LoRaWAN™ connections, offering flexibility and scalability in connectivity options. Some embodiments include leveraging cellular networks, mesh networks, or low-power wide-area networks (LP-WAN). the Connect API adapts to various infrastructure requirements and deployment scenarios, ensuring reliable and resilient connectivity for EV charging operations. The Connect API empowers building owners, grid operators, and EV users to unlock the full potential of electric mobility and sustainable energy management.

Some embodiments may include the implementation of streamlined payments processing capabilities within the Connect API, aimed at simplifying property management billing and expediting payment remittance processes. By integrating with leading real estate accounting platforms such as Yardi, Entrada, and Appfolio, the Connect API enables the synchronization of charging transaction data with property management systems. This integration automates the billing process for EV charging services, allowing property managers to generate invoices efficiently and accurately based on charging usage data collected from the charging infrastructure. The Connect API facilitates faster payment remittance by providing real-time transaction updates and reconciliation reports to property management platforms, ensuring timely and transparent financial transactions.

The Connect API enhances operational efficiency for property managers by offering centralized control and visibility over EV charging revenue streams. By leveraging payment processing capabilities, property managers can effectively track and manage charging-related finances within their existing accounting workflows. This integration eliminates the need for manual data entry and reconciliation, reducing administrative overhead and potential errors associated with traditional billing processes.

Some embodiments may include the integration of aggregated multi-modal building platform capabilities within the Connect API, facilitating seamless interoperability with various smart building, smart parking, vehicle telematics, and information display platforms. By consolidating data streams from diverse sources, such as building management systems, parking management platforms, vehicle telematics providers, and digital signage solutions, the Connect API offers comprehensive insights into building operations and mobility patterns. This integration enables property managers to leverage a holistic view of their properties, encompassing occupancy trends, parking availability, vehicle charging demand, and real-time transportation information. Through aggregated multi-modal building platform integration, the Connect API enhances operational efficiency and tenant satisfaction by providing actionable insights to optimize building utilization and mobility services.

The Connect API may also enhance user experiences through the user application by enabling interactions with smart building and transportation systems through integrated information display platforms. By connecting with digital signage solutions, mobile applications, and in-vehicle telematics systems, the Connect API delivers relevant information and services to building occupants and vehicle users in real-time. Some embodiments include displaying parking availability, EV charging station locations, or dynamic transportation schedules. The Connect API uses this information to empower property managers and enhance the accessibility and usability of their properties. This integration improves the overall user experience and promotes sustainable transportation practices by encouraging the use of EV charging facilities and alternative transportation options.

Some embodiments may include the integration of the OpenADR 2.0b API within the Connect API and surrounding platforms and systems. This allows for communication and interoperability with demand response systems and energy management solutions. OpenADR (Open Automated Demand Response) is an open standard protocol designed to facilitate communication between electricity providers and end-users for the purpose of managing electricity demand during peak periods or grid emergencies. Through the OpenADR 2.0b API integration, the Connect platform may receive signals from utility or grid operators indicating demand response events or pricing signals. These signals can trigger automated responses within connected buildings or facilities, such as adjusting HVAC systems, dimming lighting, or curtailing non-essential loads. By leveraging the capabilities of OpenADR 2.0b, property managers can proactively manage energy consumption, reduce peak demand charges, and contribute to grid stability and reliability. Additionally, the integration supports the current bi-directional communication, allowing the Connect platform to provide feedback to utility operators regarding energy consumption patterns, load flexibility, and response effectiveness, thereby fostering collaboration between stakeholders in the energy ecosystem.

Some embodiments may include vehicle telematics-enabled Distributed Energy Resource Management Systems (DERMS) and participation in transactive energy markets, facilitated by real-time state-of-charge forecasting and optimization. Leveraging vehicle telematics data, the Connect platform can integrate with electric vehicles (EVs) to monitor their state of charge, location, and charging preferences. By analyzing this data in conjunction with grid conditions and energy market dynamics, the platform can optimize charging schedules, coordinate vehicle-to-grid (V2G) interactions, and participate in demand response programs or energy trading activities.

With real-time state-of-charge forecasting capabilities, the Connect platform can predict future energy requirements of EV fleets and dynamically adjust charging profiles to balance grid constraints, energy costs, and user preferences. By accurately forecasting state of charge and optimizing charging strategies, property managers can maximize the value of their EV assets, minimize electricity expenses, and support grid stability objectives. In some embodiments, integration with transactive energy markets allows property managers to monetize flexibility in EV charging patterns, leveraging price signals and incentives to optimize energy consumption and participate in grid-balancing services.

Figure 3:
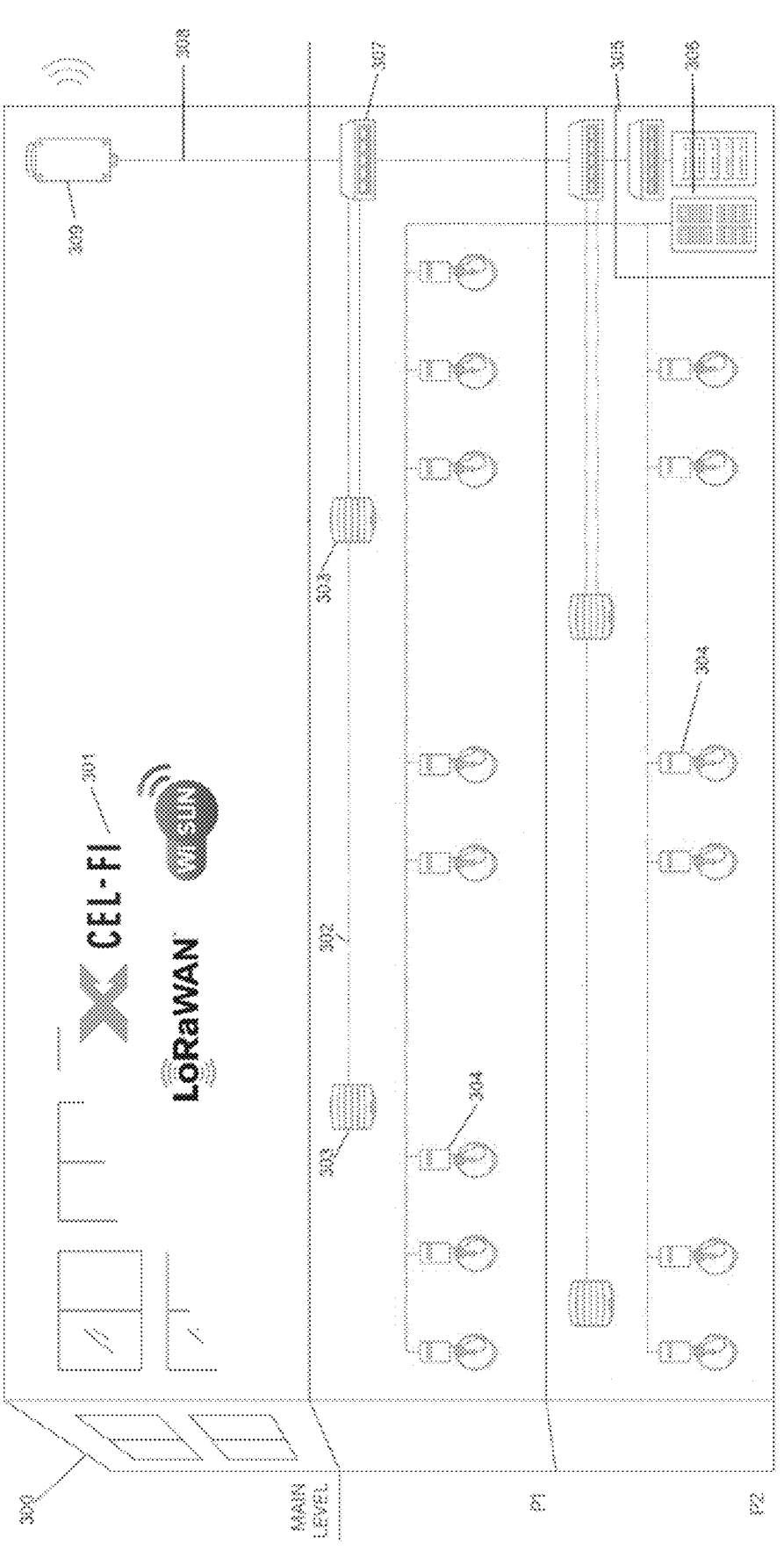
FIG. 3 depicts a diagram of connect Application Protocol Interface (API) networking systems that connect charging with smart building and energy management platforms.

FIG. 3 depicts a diagram of the connect API networking systems that connects charging with smart building and energy management platforms. Some example networks used by the smart building and energy management platforms may include Cel-Fi™, LoRaWAN™), or Wi-SUN™ networks.

Building 300 is an example including connection networks 301, Cell-Fi™, Mesh, and/or LoRaWAN™ connection 302, secondary connection devices 303, EV chargers 304, Electrical room 305, EV electric panel 306, main connection device 307, cellular gateway 308 (usually installed on the building's exterior, though may be installed internally in come embodiments), and building internet access point 309.

FIG. 3 is meant to be an example of one possible building configuration, and is not meant to limit the possible other configurations in any way.

VII. Building Management System (HVAC and Variable Frequency Drive)

Some embodiments may include the integration of a building management platform for multi-modal building management integration, creating a robust network effect that further strengthens the system's position within the smart building ecosystem.

As used herein, "Multi-modal" refers to the integration or combination of different modes or methods within a single system or platform. In the context of building management, a multi-modal approach typically involves incorporating various modes of operation or functionalities to address different aspects of building management or to serve diverse user needs.

Figure 4:
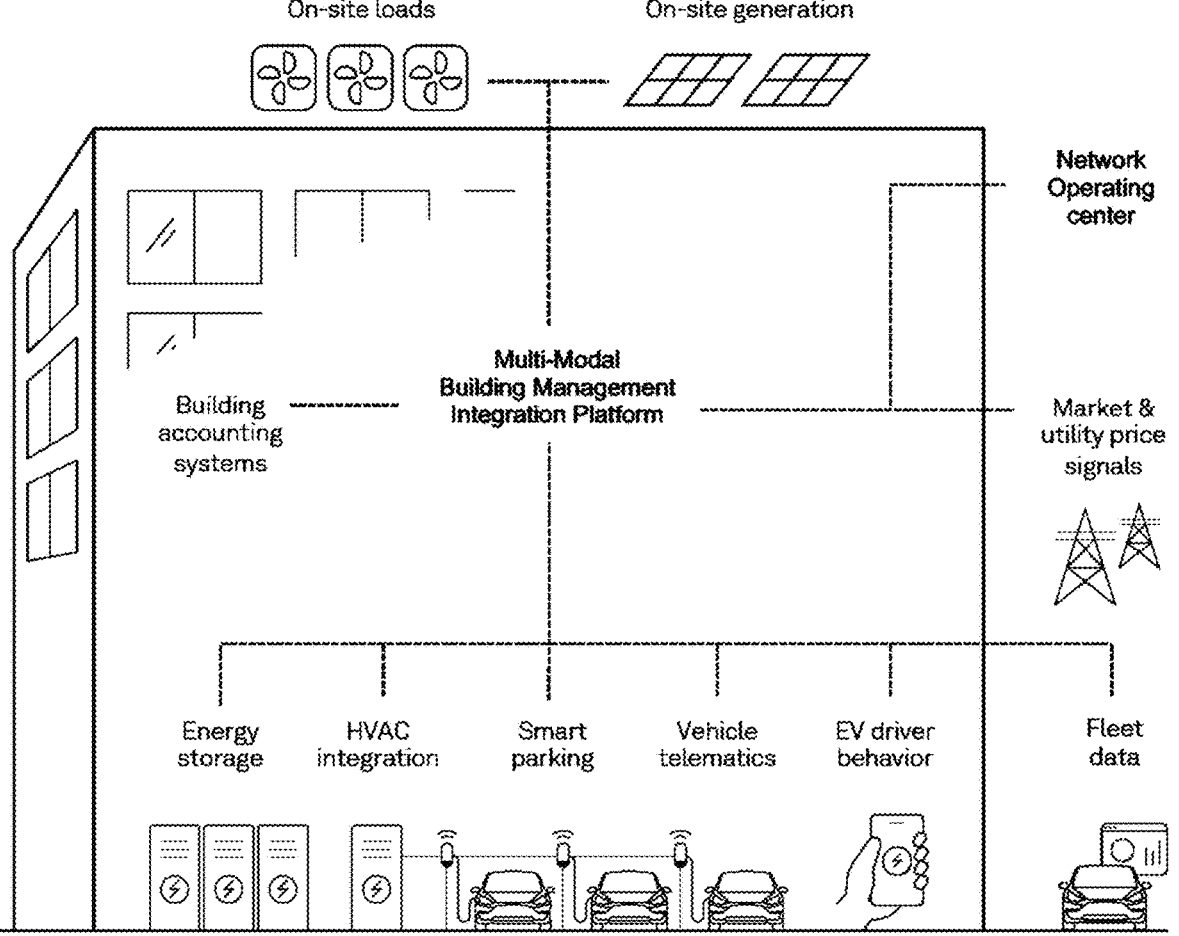
FIG. 4 depicts a diagram of a platform for multi-modal building management integration and the infrastructure of the platform.

FIG. 4 depicts a diagram of a platform for multi-modal building management integration and the infrastructure of the platform.

By integrating with this platform, the system gains access to a suite of building management tools and functionalities to optimize energy usage, enhance operational efficiency, and improve occupant comfort. This integration enables seamless coordination between various building systems, such as HVAC, lighting, and EV charging, ensuring they operate in concert to maximize efficiency and minimize energy waste. It enhances the overall intelligence and responsiveness of the building, allowing it to adapt dynamically to changing conditions and occupant needs.

Example embodiments connect with the building management (or host) platform. This allows the system to facilitate data-driven decision-making and predictive analytics to optimize building performance and energy usage. The platform aggregates data from various sources within the building, including IoT sensors, energy meters, and occupancy sensors, and analyzes it to identify patterns, trends, and opportunities for optimization. This data-driven approach enables proactive maintenance, predictive energy management, and continuous improvement initiatives, leading to cost savings, sustainability gains, and enhanced user experience.

Integration of heating, ventilation, and air conditioning (HVAC) systems with electric vehicles (EVs) optimizes energy usage and reduces greenhouse gas emissions. Traditional HVAC systems and EVs significantly contribute to emissions due to their reliance on fossil fuels and high energy demands. Shifting to energy-efficient HVAC systems such as heat pumps and increasing EV adoption leads to substantial emissions reductions. However, the increase in electricity demand associated with implementing these strategies often strains existing electrical infrastructure, necessitating costly upgrades that can hinder the uptake of decarbonization technologies. To overcome this challenge, a leading load management system for EV charging may be used to interface with heat pump systems and provide bi-directional charging. By optimizing the electrical output of EV chargers and incorporating vehicle-to-grid (V2G) energy transfer, the existing grid at a site is optimized, balancing the load between EV charging and HVAC systems. Some embodiments include integrating this system into already existing EV charging systems. Some embodiments include integrating this system into new designated EV charging systems.

Expected outcomes include providing a decarbonization solution within existing grids, stimulating increased adoption rates of EVs and heat pumps, and moving buildings and transportation closer to achieving net-zero emissions. By increasing EV charging capacity and optimizing grid efficiency, significant greenhouse gas reductions are anticipated, along with cost savings for building owners and utility providers. The technology's scalability and potential for broader uptake underscore its importance in transitioning to a low-carbon economy, where transportation and buildings account for a substantial portion of global emissions.

The EV chargers may employ a strategy to hold off on charging vehicles during peak hours to save on energy costs. This is achieved through the implementation of artificial intelligence (AI) algorithms, which analyze past data on vehicle usage patterns to determine optimal charging times. By leveraging historical charging data, the system predicts when specific vehicles are typically removed from chargers, allowing for intelligent scheduling that minimizes energy consumption during peak hours while ensuring vehicles are charged when needed. Some embodiments may also charge batteries up to a certain limit before reducing the total charge to the EV battery. This will help to elongate battery life, saving on user costs to replace the EV battery less frequently.

The system may include an edge device engineered for on-premises energy management. This device/system may provide HVAC system monitoring and control needs within buildings. The system includes a broader array of functionalities that extend beyond mere temperature regulation. From optimizing power consumption to enhancing safety protocols and managing diversity factors, the system's capabilities encompass a comprehensive approach to building energy management.

In terms of power management, the system may optimize energy utilization within buildings. By intelligently managing energy usage patterns, the system can ensure efficient utilization of available resources while minimizing wastage. This may lead to substantial cost savings for building owners and operators but also contributes to reducing the environmental footprint associated with energy consumption. The system's ability to monitor and regulate various parameters such as voltage levels, current flows, and system temperatures enhances safety measures within the building environment. In the event of any anomalies or potential hazards, the system can promptly trigger alerts or shutdown procedures, thereby mitigating risks and safeguarding both occupants and equipment. These alerts may be directly sent to building managers, owners, or EV charging hosts.

The system may control the amount of power available to the EV charging network using circuit breakers, switches, relays, contactors, variable frequency drives (VFDS), programmable logic controllers (PLCs), power controllers Circuit breakers are devices designed to protect electrical circuits from damage due to overload or short circuit conditions. They can open or close a circuit automatically to interrupt the flow of electricity when necessary. Switches are manual or automated devices used to open or close electrical circuits. They can be simple on/off switches or more complex devices that provide multiple control options. Relays are electromechanical switches that are controlled by an electrical signal. They can be used to control power flow in response to specific conditions or signals. Contactors are similar to relays but are designed to handle higher currents and voltages. They are commonly used in industrial applications for controlling large electrical loads. Variable Frequency Drives (VFDs) are used to control the speed of electric motors by varying the frequency and voltage of the power supplied to the motor. They are commonly used in applications such as industrial machinery and HVAC systems. Programmable Logic Controllers (PLCs) are digital computers used to automate control processes in industrial environments. They can be programmed to monitor sensors, make decisions based on predefined logic, and control various devices to regulate power flow. Power Controllers regulate power by adjusting voltage, current, or phase angle. They are often used in applications where precise control of power is required, such as heating systems, lighting control, or industrial processes.

In an example embodiment, the EV charging system measures the charging of multiple vehicles, determines whether the building HVAC system is using more energy than normal, and changes the amount of power being delivered to EVs on the EV chargers. Some embodiments may also include predicting whether an electric vehicle needs to be charged by a certain time based on charging trends for that vehicle. If the prediction determines that the vehicle does not need to be charged at this time, then the system may determine the total energy usage of the building and charge the vehicle during off-peak hours to save on energy costs or prevent overloading the building's energy threshold. The prediction may also connect to a user application (in some embodiments this is the user app) that asks a user what time they need to use their vehicle to determine the best time to charge the vehicle based on peak and off-peak energy hours.

Some embodiments may include bi-directional charging units that effectively use the EVs as batteries during peak hours. Building owners may collect energy from EVs to use during peak hours and then charge them again during off-peak hours if there is an energy surge or unusually high energy prices at the given time.

Furthermore, the system facilitates the enhancement of diversity factors within buildings, a critical aspect of efficient energy distribution. The diversity factor refers to the ratio of the sum of individual maximum demands of various subdivisions of a system to the maximum demand of the entire system. By dynamically adjusting energy distribution based on real-time demand patterns, the system optimizes diversity factors, thereby balancing loads effectively and reducing strain on electrical infrastructure. This not only improves the overall resilience and reliability of the building's energy systems but also ensures smoother operation and longevity of the equipment involved.

A Variable Frequency Drive (VFD) is an electrical device commonly used in HVAC systems to regulate the speed of an alternating current (AC) motor, particularly in fans. By adjusting the electrical power frequency supplied to the motor, a VFD can increase or decrease the rotations per minute (RPM), thereby controlling system airflow. Although VFDs can also be utilized in pumps and compressors, our focus here remains on their application in airside systems. The primary function of a VFD lies in modifying fan speed to predefined set points, ensuring a predictable response to changes in airflow for improved ventilation. Additionally, VFDs are adept at responding to zone control signals, adjusting airflow to meet varying heating or cooling stage requirements within a building.

In recent years, VFD technology has evolved from being perceived as a HVAC innovation with a high price tag to becoming increasingly commonplace in both retrofit and new systems. As advancements in electronic and control technologies continue to enhance VFD performance, the benefits and flexibility they offer have become more pronounced. One significant advantage of utilizing VFDs is the substantial improvement they bring to ventilation systems, contributing to the creation of safer and healthier indoor environments. Moreover, the ability of VFDs to respond to control signals enables better management of indoor air quality parameters such as temperature, humidity, pressure, and carbon dioxide ($CO_2$) levels, further enhancing occupant comfort and well-being.

Furthermore, the adoption of VFDs in HVAC systems translates into tangible energy savings and reduced maintenance requirements. By operating fan motors at variable speeds, VFDs decrease energy consumption, particularly when motors are not operating at maximum capacity. This energy efficiency contributes to cost savings and environmental sustainability goals. Additionally, the smoother operation facilitated by VFDs reduces wear and tear on fan motors, extending their lifespan and minimizing maintenance needs. Consequently, the widespread integration of VFDs in residential HVAC systems underscores their pivotal role in advancing energy efficiency, indoor air quality, and overall system performance in buildings.

The system may also control variable frequency drives (VFDs) of heat pumps for building energy management purposes. When integrated with VFD systems, the system allows for precise control over how heat pumps operate, making them more energy-efficient and improving their overall performance. This highlights how versatile the system is and how it can lead to big improvements in how energy is managed in buildings. Overall, the system is a flexible solution that can help save energy, increase safety, and support sustainability in buildings, leading to a more efficient and durable built environment.

VIII. EV Charger Mesh Connectivity

Example embodiments include implementing mesh connectivity between Electric Vehicle (EV) chargers in a network, to streamline the charging process and enhance user experience. As the number of EVs continues to rise, the demand for efficient charging infrastructure becomes increasingly important. The example embodiments can address this need by using a mesh network architecture to enable seamless communication and coordination among charging stations within a geographic location.

Some embodiments may include the introduction of RFID mesh network architecture. The wireless mesh network may consist of a coordinator located in a central charging station and routers located in each custom-made EV-mounted Vehicle Monitoring/Identification Modules (VMMs). The coordinator may serve as the RFID reader, while the routers in the VMMs serve as the RFID badges, allowing for secure and efficient communication between the EVs and the charging stations.

Charging authentication with the RFID mesh network may involve several processes, including MAC address retrieval, user authorization, and EV plug-in status detection. Upon arrival, EVs may be automatically detected, and if the corresponding tag ID is authorized, charging may be initiated seamlessly without any action required from the user. This streamlined authentication process simplifies user experience and eliminates the need for manual intervention, enhancing convenience and efficiency.

An example embodiment also includes RFID reader and EV plug-in status detection components, which play important roles in ensuring reliable and accurate charging authentication. The RFID reader, functioning as the coordinator, handles messages between the gateway and the end devices/ routers, while the EV plug-in status detection monitors plug-in status by detecting pilot signal voltage levels set by the EV. These components work in tandem to facilitate smooth and efficient charging operations while ensuring the security and integrity of the charging process.

Wi-SUN™ (Wireless Smart Utility Network) is an example technology underpinning the mesh connectivity of example embodiments for EV chargers, providing a robust and interoperable communication standard ideally suited for large-scale outdoor IoT networks. Wi-SUN™ enables seamless connectivity between smart-grid devices, facilitating applications such as Advanced Metering Infrastructure (AMI), distribution automation, and Field Area Networks (FAN). Exemplary embodiments include the use of Wi-SUN in large-scale or small-scale indoor IoT networks.

Wi-SUN™ operates on a wireless mesh network architecture, allowing for reliable and efficient communication over extended distances, with coverage extending up to 4 km. Operating across multiple frequency bands including 868 MHz (EU), 915 MHz (USA), and the 2.4 GHz ISM bands, Wi-SUN™ offers flexibility and adaptability to various regional requirements and environments. With data rates of up to 300 kbps and latency as low as 0.02 seconds, Wi-SUN™ ensures swift and responsive communication for real-time monitoring and control applications.

One of the features of Wi-SUN™ technology lies in its power efficiency, consuming minimal power during resting periods and low-power listening, making it suitable for battery-operated devices and extending network longevity. Furthermore, Wi-SUN™'s scalability allows for the deployment of networks with up to 5,000 devices per network and supports up to 10 million endpoints worldwide, ensuring seamless integration into large-scale smart city and utility deployments.

In comparison to other low-power wide area networks such as LoRa and NB-IoT, Wi-SUN™ offers distinct advantages in terms of interoperability, scalability, and power efficiency, making it a great choice for smart utilities and smart cities applications. The Wi-SUN™ Alliance, a consortium of global corporations and industry leaders, advances the Wi-SUN™ technology and promotes open industry standards for wireless communication.

Through its Field Area Network (FAN) program, the Wi-SUN™ Alliance wirelessly connects multiple devices, enabling city developers, utilities, and service providers to deploy integrated solutions for applications such as distribution automation, street lighting, advanced metering infrastructure, and intelligent transport systems. With a focus on ecosystem growth and product connectivity, the Wi-SUN™ Alliance ensures the development of robust testing and certification programs, fostering collaboration and innovation within the smart city and utility domains.

Some example embodiments can use Wi-SUN™ FAN (Field Area Network) or other Sub-GHz RF technologies. Wi-SUN™ FAN (Field Area Network) or other Sub-GHz RF technologies offer improved connectivity and reliability, particularly in environments where obstacles such as walls may hinder communication. By leveraging Wi-SUN™ or Sub-GHz RF, the charging infrastructure can achieve better connectivity between EV chargers within the mesh network, as well as with hosting and user apps, enhancing overall system performance and user experience. Wi-SUN™ supports a greater number of end nodes to cover greater distances than most other Sub-GHz services.

Some embodiments may include the use of the Wi-SUN™ Alliance to allow the EV charging systems to interconnect onto a single network. This is especially useful when integrated with the bi-directional charging capabilities of the EV chargers in the mesh network/system. The Wi-SUN™ Alliance allows for easy connection of all of the EV chargers to the host application/platform, user application/ platform, power grid, building management software, VFD in HVAC system, or other EV chargers on a different floor or in a different building owned by the same hosts. Some embodiments may include connecting multiple networks of EV chargers to the user application using the Wi-SUN™ alliance and finding a user the best price in the area.

Exemplary embodiments may include EV chargers located in an area that cannot directly access the Internet via a wi-fi router or cellular network. In this case, EV chargers may connect to wi-fi or an internet backbone via another EV charger in the mesh network of EV chargers. EV chargers not in an area that can directly access internet or wi-fi can use the mesh network to connect to another EV charger, the energy management system (EMS), or to the Internet through one of the other EV chargers in the system. Some embodiments may include a first (or main) EV charger with an internet, cellular wi-fi connection and connects the rest of the EV chargers to the internet, cellular, or wi-fi through the mesh network. Exemplary embodiments include using a sub-GHZ frequency for the mesh network.

Example embodiments may include integrating Wi-SUN™ modules into the existing charging stations and network infrastructure. These modules enable communication over longer distances and through obstacles, making them ideal for establishing robust connections between charging stations located in different areas of a parking garage or facility. Additionally, Wi-SUN™ or Sub-GHz RF technology provides enhanced reliability and stability compared to traditional wireless communication protocols such as WiFi and Bluetooth™ low-energy (BLE), ensuring seamless operation of the charging infrastructure even in challenging environments. Sub-GHz frequency bands are also less congested than the 2.4 GHz frequency band commonly used for WiFi and Bluetooth. Some embodiments may still use WiFi or BLE services because of cost or case of use. Some embodiments include other reasons for using WiFi or BLE.

The integration of Wi-SUN™ or other Sub-GHz RF technologies enables efficient communication between the charging stations and a centralized hosting app responsible for monitoring and managing the charging network. The hosting app can receive real-time data and status updates from each charging station, allowing administrators to remotely monitor charging activities, diagnose issues, and optimize system performance. Furthermore, the hosting app can facilitate firmware updates, configuration changes, and maintenance tasks, ensuring the reliability and security of the charging infrastructure.

Integration with Wi-SUN™ technologies enables communication between the charging infrastructure and user apps installed on EV owners' smartphones or mobile devices (and in some cases applications installed directly in the vehicle's interface). Through the user app, EV owners can remotely monitor the charging status of their vehicles, receive notifications when charging is complete or interrupted, and access historical charging data. Additionally, the user app may offer features such as scheduling charging sessions, setting charging preferences, and accessing billing and payment information, enhancing convenience and control for EV owners.

Some other embodiments may include using Wi-SUN™ FAN, Zigbee™, EnOcean™, io-homecontrol™, ONE-NET, INSTEON™, Z-Wave™, or other Sub-GHz standards-based solutions.

In the described programs, methods or block diagrams, the boxes may represent events, operations, steps, functions, processes, modules, messages, and/or state-based operations, etc. While some of the example embodiments have been described as occurring in a particular order, some of the steps or processes may be performed in a different order provided that the result of the changed order of any given step will not prevent or impair the occurrence of subsequent steps. Furthermore, some of the messages or steps described may be removed or combined in other embodiments, and some of the messages or steps described herein may be separated into a number of sub-messages or sub-steps in other embodiments. Even further, some or all of the steps may be repeated, as necessary. Elements described as methods or steps similarly apply to computing devices or subcomponents, and vice-versa. Reference to such words as "sending" or "receiving" could be interchanged depending on the perspective of the particular device.

The described embodiments are considered illustrative and not restrictive. Example embodiments described as methods would similarly apply to computing devices or devices, and vice-versa.

The various example embodiments are merely examples and are in no way meant to limit the scope of the examples and example embodiments. Variations will be apparent to persons of ordinary skill in the art, such variations being within the intended scope. In particular, features from one or more of the example embodiments may be selected to create alternative embodiments comprises of a sub-combination of features which may not be explicitly described. In addition, features from one or more of the described example embodiments may be selected and combined to create alternative example embodiments comprised of a combination of features which may not be explicitly described. Features suitable for such combinations and sub-combinations would be readily apparent to persons skilled in the art upon. The subject matter described herein intends to cover all suitable changes in technology.

What is claimed is:

1. A non-transitory computer-readable storage medium including one or more programs of a host application on a server configured to be executed by one or more processors, the one or more programs configured for use with an internet backbone and a user device, the one or more programs configured for communicating with electric vehicle (EV) charging units, a user application, and a management system for a facility containing the EV charging units, the one or more programs including instructions for:

executing, by the server, instructions that cause the server to communicate with the EV charging units within the facility using a mesh network, the communications comprising transmitting and receiving control and status data between the server and the EV charging units via the mesh network;

executing, by the server, instructions that cause the mesh network to communicate among the EV charging units utilizing Sub-GHz networking, the Sub-GHz networking comprising a Wi-SUN™ radio frequency protocol, the mesh network having a mesh network architecture that is connected to the internet backbone and that communicates with the user device; and executing, by the server, instructions that cause the host application to remotely monitor and manage the EV charging units, including dynamically adjusting network parameters of the mesh network or charging parameters based on received control and status data, and to display in real-time in the host application a total power supply available to the EV charging units; and performing, by the server, load balancing using actual element data from at least one electrical element using facility power, the at least one electrical element being different than the EV charging units, wherein the load balancing uses actual load data from the EV charging units in real-time, and wherein the load balancing is used to control at least one variable frequency drive (VFD), wherein the VFD connects to at least one heat pump in a heating, ventilation, and air conditioning (HVAC) system.

2. The non-transitory computer-readable storage medium of claim 1, wherein the instructions further cause the server to communicate with at least one of the EV charging units that is positioned such that it cannot directly access the Internet via a WiFi router or cellular connection, and wherein the mesh network enables the EV charging unit to connect to another EV charging unit, an energy management system (EMS), or the Internet to facilitate communication and data transfer.

3. The non-transitory computer-readable storage medium of claim 1, wherein the instructions further cause the server to reduce the supply of power available to the EV charging units in the mesh network based on load balancing of the at least one electrical element using facility power.

4. The non-transitory computer-readable storage medium of claim 1, wherein the at least one electrical element is the heating, ventilation, and air conditioning (HVAC) system containing the at least one heat pump.

5. The non-transitory computer-readable storage medium of claim 1, wherein the internet backbone is one of fiber networks or cellular networks.

6. The non-transitory computer-readable storage medium of claim 1, wherein the instructions further cause the user application to connect to a vehicle using an in-car smartphone integration application.

7. The non-transitory computer-readable storage medium of claim 1, wherein the instructions further cause the host application to remotely monitor at least one of total battery life, battery percent, or charging rate of a vehicle.

8. The non-transitory computer-readable storage medium of claim 1, wherein the host application is used by a host, wherein the host is one of a facility owner, property manager, and facility manager.

9. The non-transitory computer-readable storage medium of claim 1, wherein the EV charging units are distributed across multiple floors within the facility.

10. The non-transitory computer-readable storage medium of claim 1, wherein the EV charging units are bi-directional EV charging units.

11. The non-transitory computer-readable storage medium of claim 10, wherein the instructions further cause the bi-directional EV charging units to facilitate use of electric vehicles (EVs) as energy storage devices during peak hours, enabling collection of energy from the EVs for use by the facility.

12. The non-transitory computer-readable storage medium of claim 1, wherein the instructions further comprise enabling the EV charging units to communicate with a second EV charger located in another facility owned by a same host.

13. The non-transitory computer-readable storage medium of claim 1, wherein the instructions further comprise providing the user application with features for monitoring EV energy usage, for scheduling of charging sessions, and authorizing payment for charging services.

14. The non-transitory computer-readable storage medium of claim 7, wherein the instructions further comprise enabling the EV charging units to connect to external networks of EV charging units via the user application to access pricing information and optimize charging schedules for at least one vehicle.

15. The non-transitory computer-readable storage medium of claim 8, wherein the instructions further comprise enabling the user application to connect to the host application by an API.

16. The non-transitory computer-readable storage medium of claim 9, wherein the instructions further comprise enabling the user application to display pricing data for different EV charging units in a proximate area external to the facility to find a best charging price through the user application.

17. The non-transitory computer-readable storage medium of claim 1, wherein the facility is one of a building, tenant building, parking garage, office complex, residential complex, or industrial facility.

18. A non-transitory computer-readable storage medium including one or more programs of a host application on a server configured to be executed by one or more processors, the one or more programs configured for use with an internet backbone and a user device, the one or more programs configured for communicating with electric vehicle (EV) charging units, a user application, and a management system for a facility containing the EV charging units, the one or more programs including instructions for:

executing, by the server, instructions that cause the server to communicate with the EV charging units within the facility using a mesh network, the communications comprising transmitting and receiving control and status data between the server and the EV charging units via the mesh network;

executing, by the server, instructions that cause the mesh network to communicate among the EV charging units utilizing Sub-GHz networking, the Sub-GHz networking comprising a Wi-SUNT radio frequency protocol, the mesh network having a mesh network architecture that is connected to the internet backbone and that communicates with the user device; and executing, by the server, instructions that cause the host application to remotely monitor and manage the EV charging units, including dynamically adjusting network parameters of the mesh network or charging parameters based on received control and status data, and to display in real-time in the host application a total power supply available to the EV charging units; and performing, by the server, load balancing using actual element data from at least one electrical element using facility power, the at least one electrical element being different than the EV charging units, wherein the at least one electrical element is a heating, ventilation, and air conditioning (HVAC) system containing a heat pump.

* * * * *